United States Patent
Bousquet et al.

(10) Patent No.: US 12,163,468 B1
(45) Date of Patent: Dec. 10, 2024

(54) AIRCRAFT POWERPLANT WITH ELECTRIC TRANSMISSION(S)

(71) Applicant: Pratt & Whitney Canada Corp., Longueuil (CA)

(72) Inventors: Michel Bousquet, Longueuil (CA); Richard Freer, St-Basile-Le-Grand (CA); Kevin Nguyen, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/224,942

(22) Filed: Jul. 21, 2023

(51) Int. Cl.
*B64D 35/02* (2024.01)
*B64D 27/10* (2006.01)
*F01D 15/10* (2006.01)
*F02C 6/20* (2006.01)

(52) U.S. Cl.
CPC ............... *F02C 6/20* (2013.01); *B64D 27/10* (2013.01); *B64D 35/02* (2013.01); *F01D 15/10* (2013.01); *F05D 2220/76* (2013.01)

(58) Field of Classification Search
CPC .... F02C 6/20; F02C 5/00; F02C 3/107; F02C 3/113; B64D 27/10; B64D 35/02; F01D 15/10; F05D 2220/76
See application file for complete search history.

(56) References Cited

U.S. PATENT DOCUMENTS

| | | |
|---|---|---|
| 7,791,235 B2 | 9/2010 | Kern |
| 8,464,511 B1 | 6/2013 | Ribarov |
| 2008/0209911 A1* | 9/2008 | Schwarz ............. F02K 5/023 |
| | | 60/785 |
| 2017/0226959 A1* | 8/2017 | Julien ................. F02B 63/06 |
| 2020/0251970 A1 | 8/2020 | Zatorski |
| 2022/0235726 A1* | 7/2022 | Greifelt ................ H02K 1/27 |

FOREIGN PATENT DOCUMENTS

| | | |
|---|---|---|
| CN | 115158647 A | 10/2022 |
| DE | 102009022168 A1 | 12/2010 |
| DE | 202014002486 U1 | 6/2015 |

OTHER PUBLICATIONS

"Design of a Magnetic Gear for NASA's Vertical Lift Quadrotor Reference Vehicle", 2019 Electrified Aircraft Technical Symposium, https://ntrs.nasa.gov/api/citations/20190030679/downloads/20190030679.pdf.
"Magnetic Continuously Variable Transmission", Magnetics Magazine, Nov. 4, 2023, https://magneticsmag.com/magnetic-continuously-variable-transmission/.
"The Development of MAGSPLIT Magnetic Powersplit Technology in to Vehicle Powertrain Applications", Magnomatics Limited, https://www.romaxtech.co.jp/wp-content/uploads/romax-user-forum-20160926-public.pdf.

* cited by examiner

*Primary Examiner* — Steven M Sutherland
(74) *Attorney, Agent, or Firm* — Getz Balich LLC

(57) ABSTRACT

A system is provided for an aircraft. This system includes a propulsor rotor and a powerplant configured to drive rotation of the propulsor rotor. The powerplant includes a turbo-compounded intermittent internal combustion engine and a dual rotor electric machine. The turbo-compounded intermittent internal combustion engine includes a turbine rotor operatively coupled to the propulsor rotor through the dual rotor electric machine. The dual rotor electric machine includes a first rotor, a second rotor, a first stator and a second stator. The first stator and the second stator are arranged radially between and axially aligned with the first rotor and the second rotor.

19 Claims, 6 Drawing Sheets

AIRCRAFT POWERPLANT WITH ELECTRIC TRANSMISSION(S)

TECHNICAL FIELD

This disclosure relates generally to an aircraft and, more particularly, to transmitting power between rotating elements of a propulsion system for the aircraft.

BACKGROUND INFORMATION

Various systems and methods are known in the art for transmitting power between rotating elements of an aircraft propulsion system. For example, a mechanical transmission such as an epicyclic geartrain may mechanically link one rotating element to another rotating element. While these known power transmission systems and methods have various benefits, there is still room in the art for improvement.

SUMMARY

According to an aspect of the present disclosure, a system is provided for an aircraft. This system includes a propulsor rotor and a powerplant configured to drive rotation of the propulsor rotor. The powerplant includes a turbo-compounded intermittent internal combustion engine and a dual rotor electric machine. The turbo-compounded intermittent internal combustion engine includes a turbine rotor operatively coupled to the propulsor rotor through the dual rotor electric machine. The dual rotor electric machine includes a first rotor, a second rotor, a first stator and a second stator. The first stator and the second stator are arranged radially between and axially aligned with the first rotor and the second rotor.

According to another aspect of the present disclosure, another system is provided for an aircraft. This system includes an internal combustion engine, a turbine section and an electric transmission. The internal combustion engine includes an engine rotating assembly. The turbine section is configured to receive combustion products from the internal combustion engine. The turbine section includes a turbine rotor. The electric transmission is operatively coupling the turbine rotor to the engine rotating assembly. The electric transmission includes a dual rotor electric machine.

According to still another aspect of the present disclosure, another system is provided for an aircraft. This system includes an internal combustion engine, a turbine section and an electric transmission. The internal combustion engine includes an engine rotating assembly. The turbine section is configured to receive combustion products from the internal combustion engine. The turbine section includes a turbine rotor. The electric transmission is operatively coupling the turbine rotor to the engine rotating assembly. The electric transmission includes an electric generator and an electric motor electrically coupled to the electric generator. The electric generator includes a generator rotor configured to be rotatably driven by the turbine rotor. The electric motor includes a motor rotor configured to drive rotation of the engine rotating assembly.

The electric transmission may include a generator stator and a motor stator. The generator stator may be between the motor stator and the generator rotor. The motor stator may be between the generator stator and the motor rotor. The motor rotor and the motor stator may form the electric motor. The generator rotor and the generator stator may form the electric generator which is configured to generate electricity for powering the electric motor.

The dual rotor electric machine may include a first rotor, a second rotor, a first stator and a second stator. The first stator and the second stator may be arranged between and aligned with the first rotor and the second rotor.

The system may also include a propulsor rotor. The engine rotating assembly may be operatively coupled to and configured to drive rotation of the propulsor rotor.

The first rotor and the first stator may form an electric motor. The second rotor and the second stator may form an electric generator configured to generate electricity for powering the electric motor.

The system may also include a power source configured to selectively provide additional electricity to the electric motor to boost a mechanical power output of the electric motor.

The first rotor may be configured to drive rotation of the propulsor rotor. The turbine rotor may be configured to drive rotation of the second rotor.

The first rotor may circumscribe the first stator. The first stator may circumscribe the second stator. The second stator may circumscribe the second rotor.

The second rotor may circumscribe the second stator. The second stator may circumscribe the first stator. The first stator may circumscribe the first rotor.

The turbo-compounded intermittent internal combustion engine may also include an internal combustion engine. The internal combustion engine may include an engine rotating assembly. The turbine rotor may be operatively coupled to the engine rotating assembly through the dual rotor electric machine.

The dual rotor electric machine may be configured as a transmission between the turbine rotor and the engine rotating assembly during a first mode of operation. The dual rotor electric machine may be configured as a starter motor for the internal combustion engine during a second mode of operation.

The internal combustion engine may be configured as or otherwise include a rotary engine.

The powerplant may also include an electric gearbox. The engine rotating assembly may be operatively coupled to the propulsor rotor through the electric gearbox.

The electric gearbox may be configured as or otherwise include a second dual rotor electric machine.

The turbo-compounded intermittent internal combustion engine may also include an internal combustion engine. The internal combustion engine may include an engine rotating assembly. The engine rotating assembly may be operatively coupled to the propulsor rotor through the dual rotor electric machine.

The dual rotor electric machine may be configured as a transmission between the engine rotating assembly and the propulsor rotor during a first mode of operation. The dual rotor electric machine may be configured as a starter motor for the internal combustion engine during a second mode of operation.

The internal combustion engine may be configured as or otherwise include a rotary engine.

The propulsor rotor may be an un-ducted propulsor rotor.

The propulsor rotor may be a ducted propulsor rotor.

The propulsor rotor may be the only propulsor rotor rotatably driven by the powerplant.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
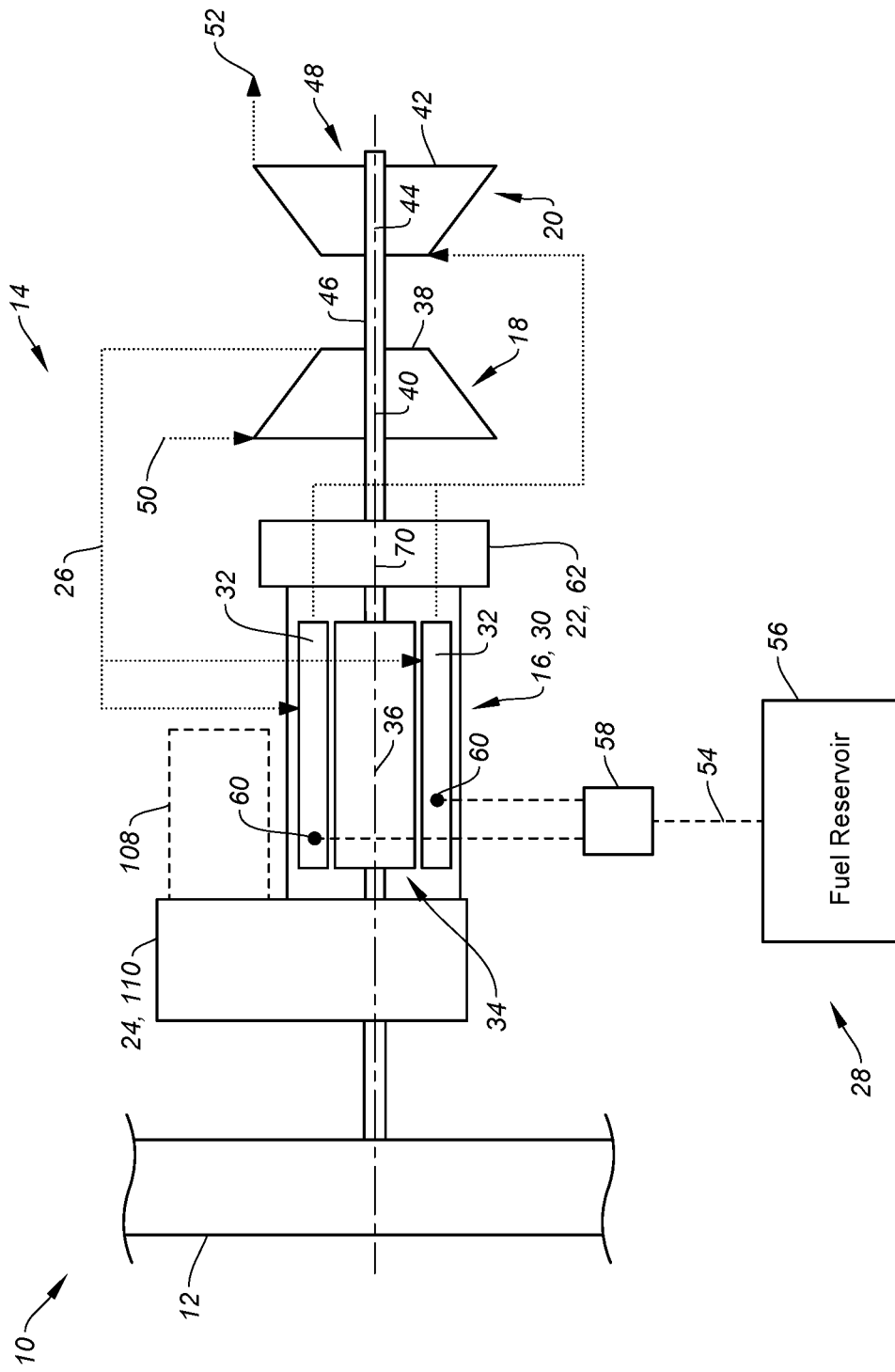
FIG. 1 is a partial schematic illustration of an aircraft propulsion system.

FIG. 1 illustrates a propulsion system 10 for an aircraft. The aircraft may be an airplane, a helicopter, a drone (e.g., an unmanned aerial vehicle (UAV)) or any other manned or unmanned aerial vehicle or system. The aircraft propulsion system 10 of FIG. 1 includes a propulsor rotor 12 and an aircraft powerplant 14 configured to drive rotation of the propulsor rotor 12.

The propulsor rotor 12 is an air mover operable to generate thrust and/or lift for the aircraft. This propulsor rotor 12 may be configured as an open, un-ducted propulsor rotor or a ducted propulsor rotor. Examples of the un-ducted propulsor rotor include a propeller rotor for a propeller propulsion system (e.g., a turboprop propulsion system), a rotorcraft rotor (e.g., a main helicopter rotor) for a rotorcraft propulsion system (e.g., a turboshaft propulsion system), a propfan rotor for a propfan propulsion system, and a pusher fan rotor for a pusher fan propulsion system. An example of the ducted propulsor rotor is a fan rotor for a turbofan propulsion system. The present disclosure, however, is not limited to the foregoing exemplary un-ducted and ducted propulsor rotors. The propulsor rotor 12 of FIG. 1 includes a propulsor rotor base (e.g., a disk or a hub) and a plurality of propulsor rotor blades (e.g., airfoils). The propulsor rotor blades are arranged circumferentially around the propulsor rotor base in an array. Each of the propulsor rotor blades is connected to (e.g., formed integral with or mechanically fastened, welded, brazed and/or otherwise attached to) and projects radially out from the propulsor rotor base.

The aircraft powerplant 14 may be configured as a turbo-compounded heat engine. The aircraft powerplant 14 of FIG. 1, for example, includes a heat engine 16, a powerplant compressor section 18, a powerplant turbine section 20 and one or more transmissions 22 and 24; e.g., speed change devices. The aircraft powerplant 14 also includes a powerplant flowpath 26 and a fuel system 28.

The heat engine 16 may be configured as or otherwise include an intermittent internal combustion (IC) engine 30 ("intermittent combustion engine"). The intermittent combustion engine 30 is an internal combustion (IC) engine in which a mixture of fuel and air is intermittently (e.g., periodically) deflagration within one or more combustion zones 32. Each combustion zone 32 may be configured as or otherwise include a combustion chamber, a piston bore and/or the like within the intermittent combustion engine 30 (the heat engine 16). The deflagration of the fuel-air mixture within the combustion zones 32 drives rotation of an internal engine rotating assembly 34 of the intermittent combustion engine 30 (the heat engine 16). This engine rotating assembly 34 may include one or more pistons and/or rotors in and/or along the combustion zones 32, and is rotatable about an engine axis 36. Examples of the intermittent combustion engine 30 include, but are not limited to, a reciprocating piston engine (e.g., an inline (I) engine, a V-engine, a W-engine, etc.) and a rotary engine (e.g., a Wankel engine). The present disclosure, however, is not limited to intermittent combustion engine applications.

The compressor section 18 includes a bladed compressor rotor 38. This compressor rotor 38 may be configured as a radial flow compressor rotor; e.g., an axial inflow-radial outflow compressor rotor, a centrifugal compressor rotor, a compressor impeller, etc. Alternatively, the compressor rotor 38 may be configured as an axial flow compressor rotor; e.g., an axial inflow-axial outflow compressor rotor. The compressor rotor 38 of FIG. 1 includes a compressor rotor base (e.g., a disk or a hub) and a plurality of compressor rotor blades (e.g., airfoils, vanes, etc.). The compressor rotor blades are arranged circumferentially around the compressor rotor base in an array. Each of the compressor rotor blades is connected to (e.g., formed integral with or mechanically fastened, welded, brazed and/or otherwise attached to) and projects radially out from the compressor rotor base. The compressor rotor 38 is rotatable about a compressor axis 40.

The turbine section 20 includes a bladed turbine rotor 42. This turbine rotor 42 may be configured as a radial flow turbine rotor; e.g., a radial inflow-axial outflow turbine rotor, a centrifugal turbine rotor, a turbine wheel, etc. Alternatively, the turbine rotor 42 may be configured as an axial flow turbine rotor; e.g., an axial inflow-axial outflow turbine rotor. The turbine rotor 42 of FIG. 1 includes a turbine rotor base (e.g., a disk or a hub) and a plurality of turbine rotor blades (e.g., airfoils, vanes, etc.). The turbine rotor blades are arranged circumferentially around the turbine rotor base in an array. Each of the turbine rotor blades is connected to (e.g., formed integral with or mechanically fastened, welded, brazed and/or otherwise attached to) and projects radially out from the turbine rotor base. The turbine rotor 42 is rotatable about a turbine axis 44, which turbine axis 44 may be parallel (e.g., coaxial) with the compressor axis 40.

The turbine rotor 42 may be coupled to the compressor rotor 38 through a turbo-compressor shaft 46. At least (or only) the compressor rotor 38, the turbine rotor 42 and the turbo-compressor shaft 46 may collectively form a turbo-compressor rotating assembly 48; e.g., a spool.

The turbo-compressor rotating assembly 48 and its turbine rotor 42 are operatively coupled to and rotatable with the engine rotating assembly 34 through the turbine transmission 22. With this arrangement, the turbo-compressor rotating assembly 48 and its turbine rotor 42 may rotate at a different (e.g., faster) rotational velocity than the engine rotating assembly 34. The engine rotating assembly 34 is operatively coupled to and rotatable with the propulsor rotor 12 through the propulsor transmission 24. With this arrangement, the engine rotating assembly 34 may rotate at a different (e.g., faster) rotational velocity than the propulsor rotor 12. The turbo-compressor rotating assembly 48 and its turbine rotor 42 are thereby also operatively coupled to and rotatable with the propulsor rotor 12 (e.g., sequentially) through the turbine transmission 22, the engine rotating assembly 34 and the propulsor transmission 24.

The powerplant flowpath 26 of FIG. 1 longitudinally extends sequentially through the compressor section 18 (e.g., across the compressor rotor 38), the heat engine 16 (e.g., along/across the pistons and/or the rotors of the engine rotating assembly 34) and the turbine section 20 (e.g., across the turbine rotor 42) from an airflow inlet 50 into the powerplant flowpath 26 to a combustion products exhaust 52 from the powerplant flowpath 26. The flowpath inlet 50 may also be an airflow inlet into the aircraft powerplant 14. The flowpath exhaust 52 may also be a combustion products exhaust from the aircraft powerplant 14.

The fuel system 28 is configured to deliver fuel to the combustion zones 32 within the heat engine 16; e.g., the intermittent combustion engine 30. The fuel system 28 of FIG. 1, for example, includes a fuel circuit 54, a fuel reservoir 56, a fuel regulator 58 and one or more fuel injectors 60.

The fuel circuit 54 is fluidly coupled with an outlet of the fuel reservoir 56. This fuel circuit 54 extends longitudinally through the fuel regulator 58 to the fuel injectors 60. The fuel circuit 54 thereby fluidly couples the fuel reservoir 56 and its reservoir outlet to the fuel injectors 60 through the fuel regulator 58.

The fuel reservoir 56 is configured to store fuel before, during and/or after aircraft powerplant operation. The fuel reservoir 56, for example, may be configured as or otherwise include a tank, a cylinder, a pressure vessel, a bladder or any other type of fuel storage container.

The fuel regulator 58 is configured to selectively direct and/or meter a flow of the fuel from the fuel reservoir 56 to one or more of the fuel injectors 60. The fuel regulator 58, for example, may be configured as or otherwise include a fuel pump and/or a valve (or valve system).

The fuel injectors 60 are arranged with (e.g., on, along, in, etc.) the combustion zones 32. These fuel injectors 60 are configured to direct (e.g., inject) the fuel into the combustion zones 32 to mix with compressed air for subsequent combustion.

During operation, the fuel system 28 delivers (e.g., injects) fuel into the combustion zones 32. The fuel is mixed with compressed air within the combustion zones 32. This fuel-air mixture is ignited, and combustion products generated therefrom drive rotation of the engine rotating assembly 34. The rotation of the engine rotating assembly 34 drives rotation of the propulsor rotor 12 through the propulsor transmission 24, and the rotating propulsor rotor 12 generates aircraft thrust and/or lift. The combustion products further flow out of the heat engine 16 (e.g., the intermittent combustion engine 30) into the turbine section 20 and drive rotation of the turbine rotor 42. The rotation of the turbine rotor 42 drives rotation of the compressor rotor 38, and the rotating compressor rotor 38 compresses air entering the aircraft powerplant 14 and its powerplant flowpath 26 through the flowpath inlet 50 to provide the compressed air to the heat engine 16. The rotation of the turbine rotor 42 also drives rotation of (e.g., boosts mechanical power to) the engine rotating assembly 34 through the turbine transmission 22. The rotation of the turbine rotor 42 may thereby also drive rotation of (e.g., boost mechanical power to) the propulsor rotor 12 through the powerplant members 22, 34 and 24.

As described above, the turbine transmission 22 facilitates operation of the turbo-compressor rotating assembly 48 at a different rotational velocity than the engine rotating assembly 34. The propulsor transmission 24 facilitates operation of the engine rotating assembly 34 at a different rotational velocity than the propulsor rotor 12. These propulsion system members 12, 34 and/or 48 may thereby be individually tailored for optimal operation.

Under certain conditions, there may be a rotational velocity mismatch across the turbine transmission 22 between the turbo-compressor rotating assembly 48 and the engine rotating assembly 34. This mismatch may be accommodated using a mechanical transmission, where the mechanical transmission includes a transmission geartrain (e.g., a reduction gearbox, an epicyclic geartrain, etc.) paired with a variable speed drive (VSD) (e.g., a hydraulic continuously variable transmission (CVT)). Such a mechanical transmission, however, may be relatively complex as well as increase lubrication and cooling demands on powerplant lubrication and cooling systems. Therefore, to reduce system complexity as well as to reduce lubrication and cooling demands, the turbine transmission 22 may be configured as a turbine electric transmission 62; e.g., an electric geartrain.

Figure 2:
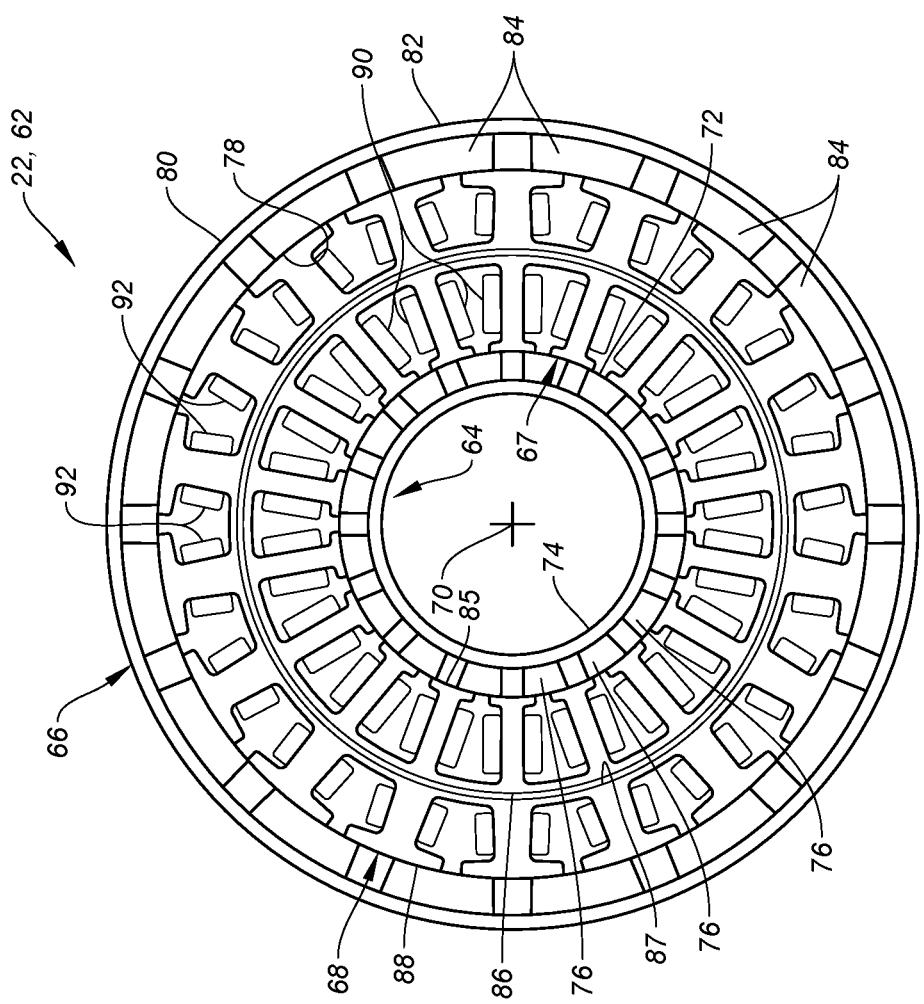
FIG. 2 is a cross-sectional illustration of a turbine electric transmission.
Figure 3:
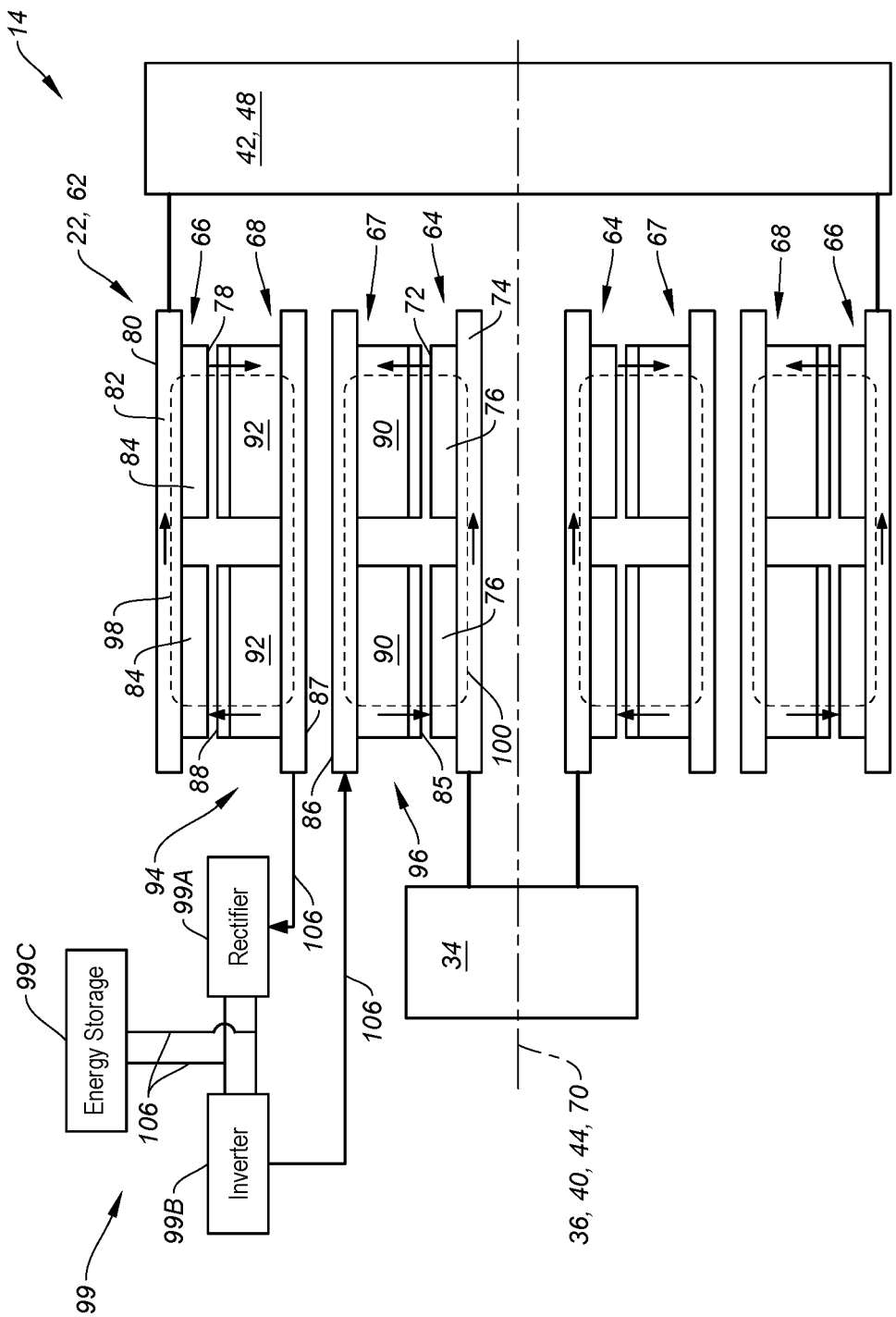
FIG. 3 is a partial schematic sectional illustration of an assembly for the aircraft propulsion system through the turbine electric transmission.

Referring to FIGS. 2 and 3, the turbine electric transmission 62 may be configured as or otherwise include a dual rotor electric machine. The turbine electric transmission 62 of FIGS. 2 and 3, for example, includes an inner electric machine rotor 64 ("inner rotor"), an outer electric machine rotor 66 ("outer rotor"), an inner electric machine stator 67 ("inner stator") and an outer electric machine stator 68 ("outer stator"). The inner rotor 64 and the outer rotor 66 are each rotatable about a common (the same) transmission axis 70, which transmission axis 70 may be an axial centerline of one or more of the electric machine members 64, 66 and/or 68 and/or an axial centerline of the entire electric machine. This transmission axis 70 of FIG. 3 may also be coaxial with one or more of the axes 36, 40 and/or 44; see also FIG. 1.

The inner rotor 64 of FIG. 3 extends axially along the transmission axis 70. The inner rotor 64 extends radially to an outer side 72 of the inner rotor 64. The inner rotor 64 extends circumferentially about (e.g., completely around) the transmission axis 70. The inner rotor 64 includes an inner hub 74 (e.g., tubular or cylindrical hub) and one or more inner permanent magnets 76 distributed circumferentially about the inner hub 74 and the transmission axis 70 in an array. Each of these inner permanent magnets 76 is disposed at the inner rotor outer side 72. Each of the inner permanent magnets 76 is fixed to the inner hub 74. An inner magnet retention device (not shown for ease of illustration) such as a sleeve or a carbon fiber wrap may be arranged circumferentially over outer surfaces of inner permanent magnets 76. This inner magnet retention device may thereby form the outer side 72 of the inner rotor 64.

The outer rotor 66 extends axially along the transmission axis 70. The outer rotor 66 of FIG. 3 also extends axially along (e.g., at least partially or completely overlapping) the inner rotor 64. The outer rotor 66 extends radially between and to an inner side 78 of the outer rotor 66 and an outer side 80 of the outer rotor 66. The outer rotor inner side 78 is disposed radially opposite (e.g., faces) and spaced radially from the inner rotor outer side 72. The outer rotor 66 extends circumferentially about (e.g., completely around) the transmission axis 70. The outer rotor 66 also extends circumferentially about (e.g., circumscribes) the inner rotor 64. The outer rotor 66 includes an outer hub 82 (e.g., tubular hub) and one or more outer permanent magnets 84 distributed circumferentially about the transmission axis 70 in an annular array. Each of these outer permanent magnets 84 is disposed at the outer rotor inner side 78, where the outer hub 82 is radially outward of and circumscribes the array of the outer permanent magnets 84. Each of the outer permanent magnets 84 is fixed to the outer hub 82.

The inner stator 67 of FIG. 3 is arranged radially between and is axially aligned with the inner rotor 64 and the outer rotor 66. This inner stator 67 extends axially along the transmission axis 70. The inner stator 67 of FIG. 3 also extend axially along (e.g., at least partially or completely overlapping) the inner rotor 64 and the outer rotor 66. The inner stator 67 extends radially between and to an inner side 85 of the inner stator 67 and an outer side 86 of the inner stator 67. The inner stator inner side 85 is disposed radially opposite (e.g., faces) and is (e.g., slightly) spaced from the inner rotor outer side 72. The inner stator 68 includes one or more inner electrical coils 90 distributed circumferentially about the transmission axis 70.

The outer stator 68 of FIG. 3 is arranged radially between and is axially aligned with the inner rotor 64 and the outer rotor 66. More particularly, the outer stator 68 of FIG. 3 is arranged radially between and is axially aligned with the inner stator 67 and the outer rotor 66. This outer stator 68 extends axially along the transmission axis 70. The outer stator 68 of FIG. 3 also extend axially along (e.g., at least partially or completely overlapping) the inner rotor 64, the outer rotor 66 and the inner stator 67. The outer stator 68 extends radially between and to an inner side 87 of the outer stator 68 and an outer side 88 of the outer stator 68. The outer stator inner side 87 is disposed radially opposite (e.g., faces) and is (e.g., slightly) spaced from the inner rotor outer side 72. The outer stator inner side 87 is disposed radially opposite (e.g., faces) and is spaced from the inner stator outer side 86. The outer stator outer side 88 is disposed radially opposite (e.g., faces) and is (e.g., slightly) spaced from the outer rotor inner side 78. The outer stator 68 includes one or more outer electrical coils 92 distributed circumferentially about the transmission axis 70.

The inner rotor 64 of FIG. 3 is mechanically coupled to the engine rotating assembly 34. The engine rotating assembly 34 is thereby operatively coupled to the turbine transmission 22 through its inner rotor 64. The outer rotor 66 of FIG. 3 is mechanically coupled to the turbo-compressor rotating assembly 48 and its turbine rotor 42. The turbo-compressor rotating assembly 48 is thereby operatively coupled to the turbine transmission 22 through its outer rotor 66. Each of the stators 67 and 68 is fixed to a stationary support structure (e.g., a housing) of the aircraft powerplant 14.

The turbine electric transmission 62 may be operated in various modes of operation. Examples of these modes include, but are not limited to, a transmission mode, a power boost mode, a power generator mode and a starter mode.

During the transmission mode, (a) at least (or only) the outer rotor 66 and the outer stator 68 are collectively operated as an electric generator 94 and (b) at least (or only) the inner rotor 64 and the inner stator 67 are collectively operated as an electric motor 96. The electric generator 94 is operated to convert mechanical power received from the turbo-compressor rotating assembly 48 and its turbine rotor 42 into electricity. The turbo-compressor rotating assembly 48 and its turbine rotor 42, for example, may drive rotation of the outer rotor 66. The rotation of the outer rotor 66 may generate a rotating magnetic field 98 with the outer stator 68, and the outer stator 68 may convert energy from the rotating magnetic field 98 into an electric potential and current—the electricity. The electric generator 94 may then provide at least some this electricity through an electric power system 99 to the electric motor 96 for further use. The power system 99 of FIG. 3 includes a rectifier 99A and an inverter 99B. The rectifier 99A is configured to convert alternating current (AC) electricity received from the electric generator 94 into direct current (DC) electricity. The inverter 99B is configured to convert the DC electricity back into AC current for powering the electric motor 96. The power system 99 may also include (or otherwise be electrically coupled to) an energy storage 99C (e.g., a battery, a battery bank, one or more capacitors, etc.), which energy storage 99C may be utilized to smooth out the electrical current through the power system 99. Upon receiving the AC electricity, the electric motor 96 is operated to convert the electricity into mechanical power. The inner stator 67, for example, may generate a rotating magnetic field 100 with the inner rotor 64 using the electricity. This rotating magnetic field 100 may drive rotation of the inner rotor 64. The inner rotor 64 may thereby drive rotation of the engine rotating assembly 34. This mechanical power may be provided to the engine rotating assembly 34 to boost mechanical power generated by combustion within the heat engine 16 (see FIG. 1).

With the foregoing arrangement, the turbine electric transmission 62 may provide a speed change device (e.g., a differential) between the turbo-compressor rotating assembly 48 and the engine rotating assembly 34. The power system 99 may be operated to regulate the electrical current provided to the electric motor 96. Referring to FIG. 3, the turbine electric transmission 62 may also accommodate a rotational velocity mismatch across the turbine electric transmission 62 between the turbo-compressor rotating assembly 48 and the engine rotating assembly 34 since there is no direct mechanical coupling between the turbo-compressor rotating assembly 48 and the engine rotating assembly 34.

In addition to the foregoing, the turbine electric transmission 62 may provide an integrated clutch functionality. For example, to decouple the turbo-compressor rotating assembly 48 from the engine rotating assembly 34, the electricity generated by the electric generator 94 may be directed to the energy storage 99C and/or one or more other devices rather than the electric motor 96.

The power system members 99A, 99B and/or 99C may be electrically coupled to the electric generator 94 and/or the electric motor 96 (or more generally the turbine electric transmission 62) through electrical circuitry; e.g., a power bus. This electrical circuitry may include one or more electrical leads 106 (e.g., high voltage lines) and one or more additional electrical devices (not shown for ease of illustration) for conditioning, metering, regulating and/or otherwise controlling electrical power transfer between the electric machine and the energy storage 99C. Examples of the electrical devices include, but are not limited to, switches, current regulators, converters and buffers.

During the power boost mode, the turbine electric transmission 62 may generally operate as described above with respect to the transmission mode. In the power boost mode, however, the electric motor 96 may receive additional electricity from the energy storage 99C in addition to the electricity generated by the electric generator 94. This additional electricity is provided to the electric motor 96 to boost a mechanical power output of the electric motor 96 and its inner rotor 64 to the engine rotating assembly 34.

During the power generator mode, the turbine electric transmission 62 may generally operate as described above with respect to the transmission mode. In the power generator mode, however, some of the electricity generated by the electric generator 94 may be directed to the electric motor 96 for powering the electric motor 96, and some of the electricity generated by the electric generator 94 may be directed to the energy storage 99C for storage and/or to one or more other aircraft systems.

During the starter mode, at least (or only) the inner rotor 64 and the inner stator 67 are collectively operated as the electric motor 96 as described above with respect to the transmission mode. In the starter mode, however, the electricity delivered to the electric motor 96 for operation may be provided (e.g., solely) by the energy storage 99C. For example, during a cold start of the aircraft powerplant 14, both the engine rotating assembly 34 and the turbo-compressor rotating assembly 48 may be stationary. The electric motor 96 may be used to drive rotation of the engine rotating assembly 34 to facilitate startup of the heat engine 16; e.g., the intermittent combustion engine 30 of FIG. 1. It is contemplated therefore the turbine electric transmission 62 may replace a traditional dedicated starter motor for the heat engine 16.

Figure 4:
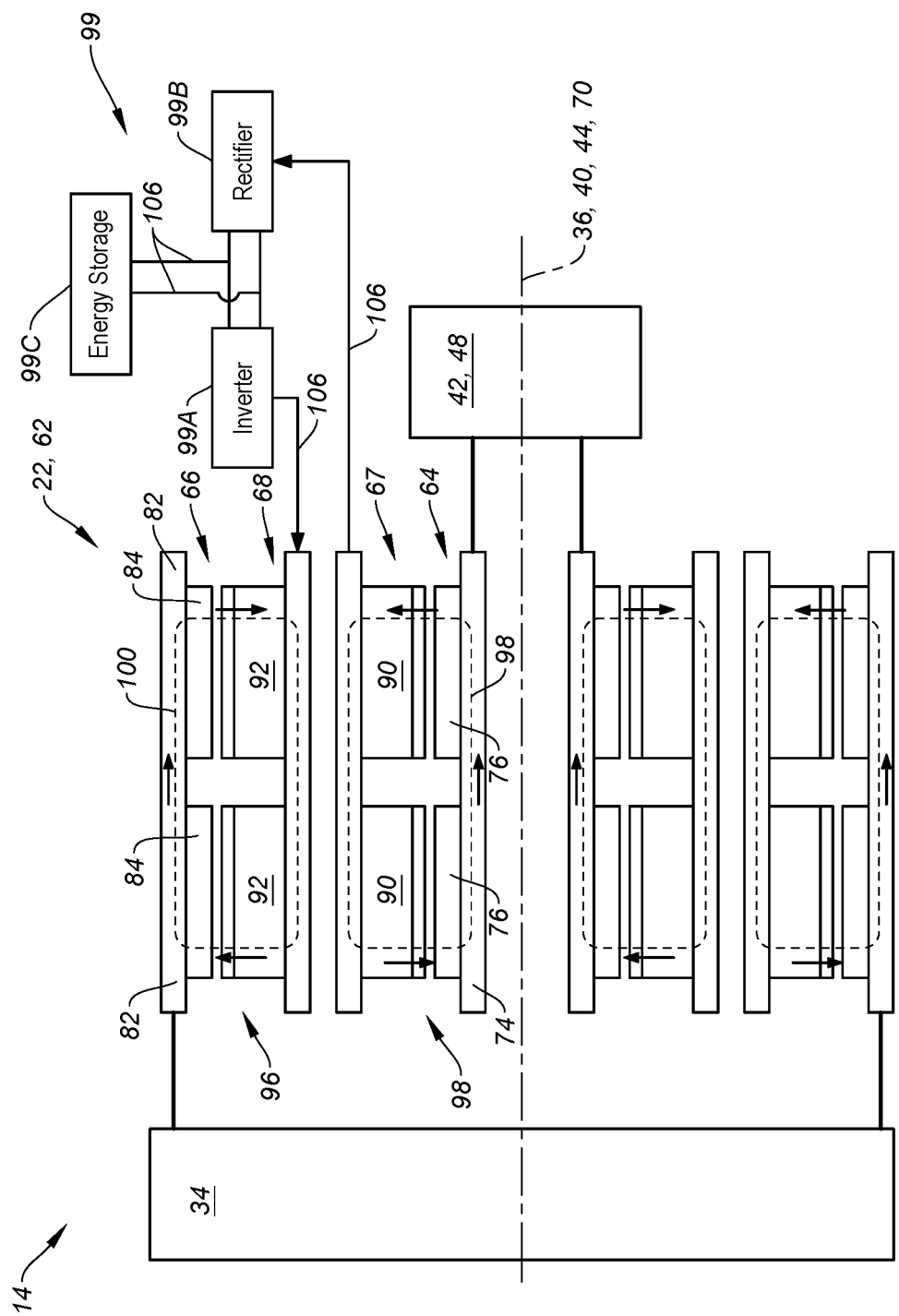
FIG. 4 is a partial schematic sectional illustration of an alternative assembly for the aircraft propulsion system through the turbine electric transmission.

In some embodiments, referring to FIG. 3, the inner rotor 64 may be mechanically coupled to the engine rotating assembly 34 and the outer rotor 66 may be mechanically coupled to the turbo-compressor rotating assembly 48 as described above. In other embodiments however, referring to FIG. 4, the inner rotor 64 may alternatively be mechanically coupled to the turbo-compressor rotating assembly 48 and the outer rotor 66 may alternatively be mechanically coupled to the engine rotating assembly 34. With such an arrangement, (a) at least (or only) the inner rotor 64 and the inner stator 67 are collectively operated as the electric generator 94 and (b) at least (or only) the outer rotor 66 and the outer stator 68 are collectively operated as the electric motor 96.

In some embodiments, the propulsor transmission 24 of FIG. 1 may be configured as a mechanical transmission. The propulsor transmission 24, for example, may be configured as or otherwise include a reduction gearbox, an epicyclic geartrain, etc. With such an arrangement, an additional electric motor 108 may be provided to further (e.g., selectively) drive rotation of the propulsor rotor 12. The propulsor transmission 24, for example, may couple both the heat engine 16 and the additional electric motor 108 to the propulsor rotor 12 (e.g., in parallel).

Figure 5:
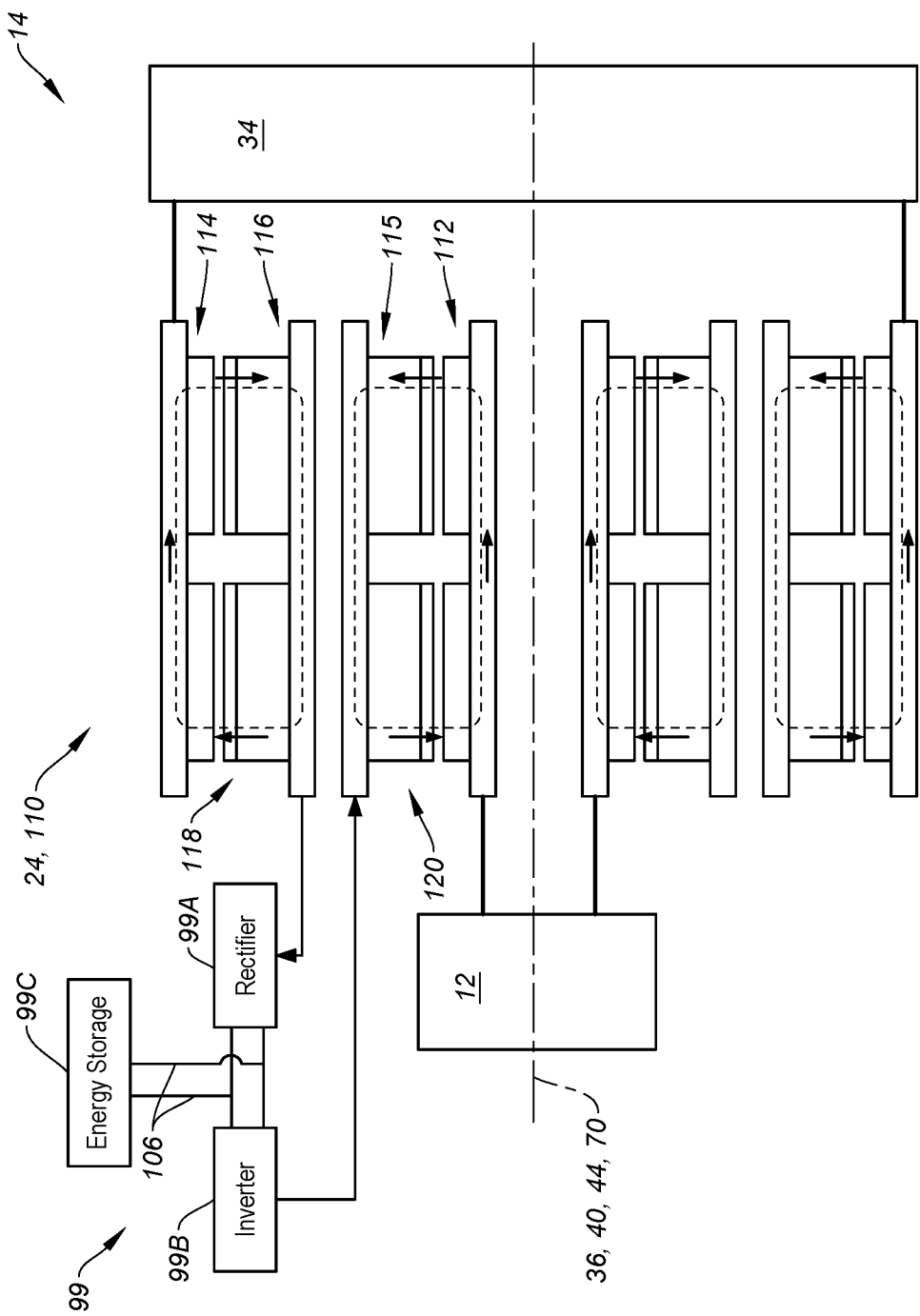
FIG. 5 is a partial schematic sectional illustration of an assembly for the aircraft propulsion system through a propulsor electric transmission.
Figure 6:
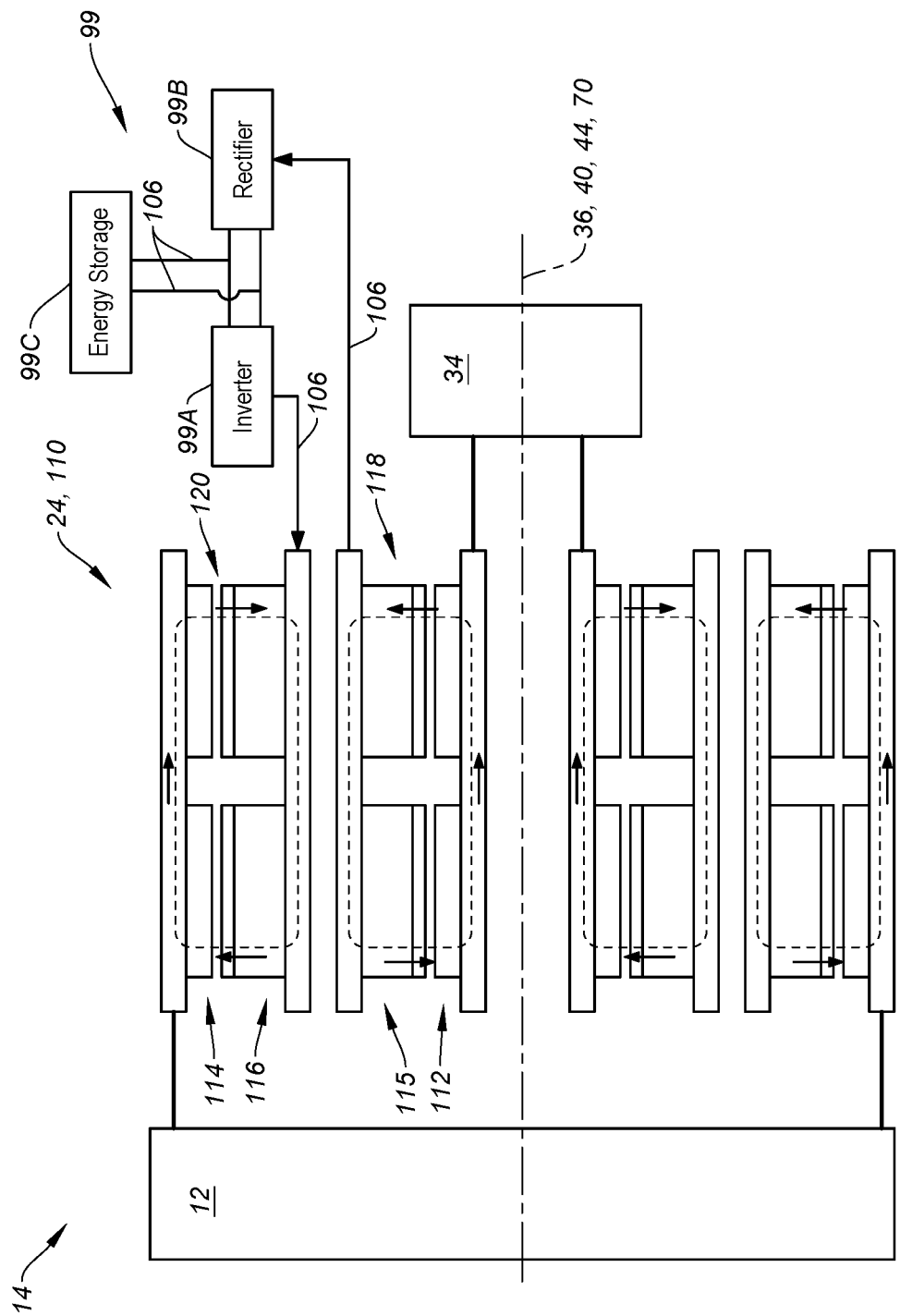
FIG. 6 is a partial schematic sectional illustration of an alternative assembly for the aircraft propulsion system through the propulsor electric transmission.

In some embodiments, the propulsor transmission 24 may alternatively be configured as a propulsor electric transmission 110. Referring to FIG. 5, the propulsor electric transmission 110 may be configured as or otherwise include a dual rotor electric machine. This propulsor electric transmission 110 may have a similar (or the same) configuration as the turbine electric transmission 62 of FIGS. 2 and 3 described above. However, an inner electric machine rotor 112 ("inner rotor") of the propulsor electric transmission 110 is mechanically or otherwise coupled to the propulsor rotor 12, and an outer electric machine rotor 114 ("outer rotor") of the propulsor electric transmission 110 is mechanically or otherwise coupled to the engine rotating assembly 34. Here, (a) at least (or only) the outer rotor 114 and an outer electric machine stator 116 ("outer stator") are collectively operated as an electric generator 118 and (b) at least (or only) the inner rotor 112 and an inner electric machine stator 115 ("inner stator") are collectively operated as an electric motor 120. Of course, it is contemplated couplings to the rotors 112 and 114 may be reversed as shown in FIG. 6. Referring again to FIG. 5, the propulsor electric transmission 110 may also have a similar (or the same) operability as the turbine electric transmission 62 of FIGS. 2 and 3 described above. For example, in a transmission mode, the engine rotating assembly 34 may mechanically power the electric generator 118, and the electric motor 120 may be powered by electricity generated by the electric generator 118 to drive rotation of the propulsor rotor 12. In a power boost mode, the electric motor 120 may receive additional electricity from the energy storage 99C. In a power generator mode, at least some of the electricity generated by the electric generator 118 may be directed to the energy storage 99C and/or elsewhere. In a starter mode, a mode of the electric generator 118 may be reversed (e.g., operated as an electric motor) in order to drive rotation of the engine rotating assembly 34 to facilitate startup of the heat engine 16.

Each electric transmission 62, 110 is described above as a dual rotor electric machine. More particularly, each dual rotor electric machine is described above as a radial dual rotor electric machine where the respective stators 67 and 68, 115 and 116 are radially between and axially aligned with the respective inner rotor 64, 112 and the respective outer rotor 66, 114. It is contemplated, however, the dual rotor electric machine may alternatively be an axial dual rotor electric machine where the respective stators 67 and 68, 115 and 116 are axially between and radially aligned with the respective rotors 64 and 66, 112 and 114. Moreover, it is further contemplated one or both of the electric transmissions 62 and 110 may alternatively be configured as another type of electric machine with an electric generator powered by a mechanical input (e.g., 48, 34) and an electric motor electrically powered by electricity from the electric generator for driving rotation of another device (e.g., 34, 12). The present disclosure therefore is not limited to any particular type or configuration of electric transmission. In addition, where the aircraft powerplant 14 includes the propulsor electric transmission 110, it is contemplated the turbine transmission 22 may alternatively be configured as or otherwise include a mechanical transmission.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A system for an aircraft, comprising:
    a propulsor rotor; and
    a powerplant configured to drive rotation of the propulsor rotor, the powerplant including a turbo-compounded intermittent internal combustion engine and a dual rotor electric machine;
    the turbo-compounded intermittent internal combustion engine comprising a turbine rotor and an internal combustion engine, the turbine rotor operatively coupled to the propulsor rotor through the dual rotor electric machine, the internal combustion engine comprising an engine rotating assembly, and the turbine rotor operatively coupled to the engine rotating assembly through the dual rotor electric machine; and
    the dual rotor electric machine including a first rotor, a second rotor, a first stator and a second stator, and the first stator and the second stator arranged radially between and axially aligned with the first rotor and the second rotor.

2. The system of claim 1, wherein
    the first rotor and the first stator form an electric motor; and
    the second rotor and the second stator form an electric generator configured to generate electricity for powering the electric motor.

3. The system of claim 2, wherein
    the first rotor circumscribes the first stator;
    the first stator circumscribes the second stator; and
    the second stator circumscribes the second rotor.

4. The system of claim 2, wherein
the second rotor circumscribes the second stator;
the second stator circumscribes the first stator; and
the first stator circumscribes the first rotor.

5. The system of claim 1, wherein
the dual rotor electric machine is configured as a transmission between the turbine rotor and the engine rotating assembly during a first mode of operation; and
the dual rotor electric machine is configured as a starter motor for the internal combustion engine during a second mode of operation.

6. The system of claim 1, wherein the internal combustion engine comprises a rotary engine.

7. The system of claim 1, wherein
the powerplant further includes an electric gearbox; and
the engine rotating assembly is operatively coupled to the propulsor rotor through the electric gearbox.

8. The system of claim 7, wherein the electric gearbox comprises a second dual rotor electric machine.

9. The system of claim 1, wherein the engine rotating assembly is operatively coupled to the propulsor rotor through a second dual rotor electric machine.

10. The system of claim 9, wherein
the second dual rotor electric machine is configured as a transmission between the engine rotating assembly and the propulsor rotor during a first mode of operation; and
the second dual rotor electric machine is configured as a starter motor for the internal combustion engine during a second mode of operation.

11. The system of claim 1, wherein the propulsor rotor is an un-ducted propulsor rotor.

12. The system of claim 1, wherein the propulsor rotor is a ducted propulsor rotor.

13. A system for an aircraft, comprising:
a propulsor rotor;
a powerplant configured to drive rotation of the propulsor rotor, the powerplant including a turbo-compounded intermittent internal combustion engine and a dual rotor electric machine;
the turbo-compounded intermittent internal combustion engine comprising a turbine rotor operatively coupled to the propulsor rotor through the dual rotor electric machine; and
the dual rotor electric machine including a first rotor, a second rotor, a first stator and a second stator, the first stator and the second stator arranged radially between and axially aligned with the first rotor and the second rotor, the first rotor and the first stator forming an electric motor, and the second rotor and the second stator forming an electric generator configured to generate electricity for powering the electric motor; and
a power source configured to selectively provide additional electricity to the electric motor to boost a mechanical power output of the electric motor.

14. A system for an aircraft, comprising:
a propulsor rotor; and
a powerplant configured to drive rotation of the propulsor rotor, the powerplant including an internal combustion engine and an electric machine;
the internal combustion engine comprising a rotary engine and a turbine rotor, the rotary engine comprising an engine rotating assembly, the turbine rotor operatively coupled to the engine rotating assembly through the electric machine, and the electric machine operatively coupled to the propulsor rotor through the engine rotating assembly; and
the electric machine including a first rotor, a second rotor, a first stator and a second stator, and the first stator and the second stator arranged radially between and axially aligned with the first rotor and the second rotor.

15. The system of claim 14, wherein the propulsor rotor is an un-ducted propulsor rotor.

16. The system of claim 14, wherein the propulsor rotor is a ducted propulsor rotor.

17. The system of claim 14, wherein
the first rotor and the first stator form an electric motor; and
the second rotor and the second stator form an electric generator configured to generate electricity for powering the electric motor.

18. The system of claim 17, wherein
the first rotor circumscribes the first stator;
the first stator circumscribes the second stator; and
the second stator circumscribes the second rotor.

19. The system of claim 17, wherein
the second rotor circumscribes the second stator;
the second stator circumscribes the first stator; and
the first stator circumscribes the first rotor.

* * * * *